Dec. 26, 1967     M. S. FORSE     3,359,789
ELECTRICAL TONOMETERS

Filed March 8, 1965     2 Sheets-Sheet 1

United States Patent Office 3,359,789
Patented Dec. 26, 1967

3,359,789
ELECTRICAL TONOMETERS
Maurice S. Forse, New Barnet, England, assignor to Ether Engineering Limited
Filed Mar. 8, 1965, Ser. No. 437,886
Claims priority, application Great Britain, Mar. 9, 1964, 9,826/64
6 Claims. (Cl. 73—80)

ABSTRACT OF THE DISCLOSURE

The tonometers disclosed exemplarily include a pin extending through a shaped concave surface for displacement by the fluid pressure of the eyeball, such displacement bending a spring which bears transducers sensitive to the bending strain.

---

This invention relates to tonometers, and provides a tonometer adapted to produce an electrical output. A tonometer serves to give an indication of the fluid pressure in the eyeball, such information being symptomatic of certain defects of the eye.

It is one object of the invention to provide a compact and relatively inexpensive tonometer.

It is another object of the invention to provide a convenient tonometer for electrical measurement of fluid pressure in the eyeball.

It is yet another object of the invention to provide a portable tonometer which is capable of accurate and repeatable measurement and yet is relatively inexpensive, and simple in operation.

The invention provides a transducer device for an ophthalmic tonometer, including a resilient member bearing at least one transducer element electrically sensitive to a bending strain, an actuator member extending at an angle from one end of said resilient member, a support member secured to the other end of said resilient member and bearing a concave surface for cooperating with the cornea of an eye; and a pin extending movably through an aperture in said concave surface and connected to said actuator member for applying a bending stress to said transducer element.

Figure 1:
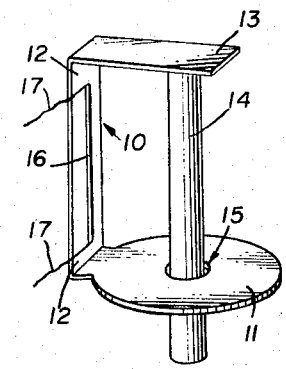
Figure 2:
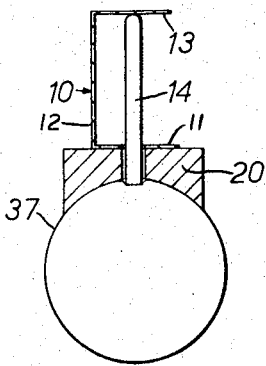
Figure 3:
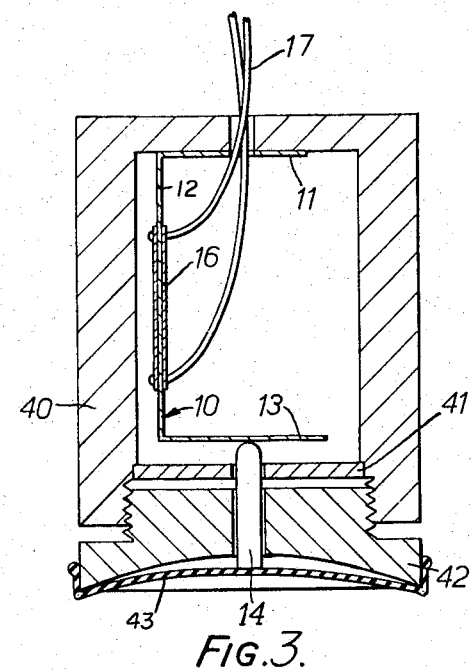
Figure 4:
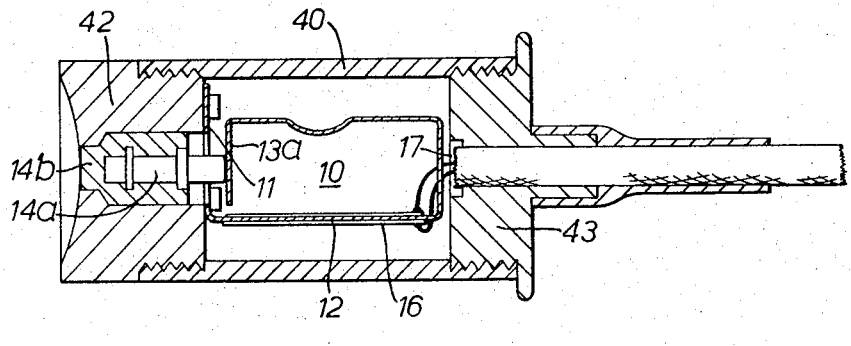
Figure 5:
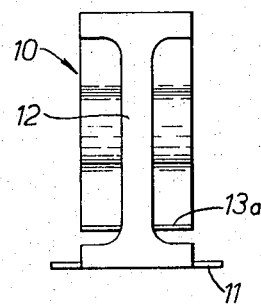

Other features and advantages of the invention will appear from the following description of embodiments thereof, given by way of example, in conjunction with the accompanying drawings, in which:

FIGURE 1 is a diagrammatic perspective view of a basic transducing device in accordance with the invention, FIGURE 2 is a diagram indicating the principle of using a transducer device of the type indicated in FIGURE 1 in an ophthalmic tonometer, FIGURE 3 is a diagrammatic sectional view through a modified ophthalmic tonometer transducer device in accordance with the invention, FIGURE 4 is a sectional view through another ophthalmic tonometer transducer device in accordance with the invention, and FIGURE 5 is an elevation of a shaped spring used in the device of FIGURE 4.

The transducer device shown in FIGURE 1 comprises a strain element consisting of a shaped spring 10, comprising a mounting portion 11, conveniently annular, a strain portion 12 disposed substantially at right angles to the portion 11 and an actuating portion 13, approximately parallel to the portion 11. The spring can be made of any suitable material, but a metal such as beryllium-copper is very suitable. An actuating pin 14 passes through an opening 15 in the lower portion 11 and bears against the underside of the actuating portion 13 of the spring.

Semi-conductor strain gauge transducer elements are secure to one or preferably both surfaces of the strain portion 12 of the spring, as at 16, with suitable electrical connections 17 to the strain gauges. An electric output is produced when the transducer elements 16 are bent about axes perpendicular to their lengths.

One mode of using a transducer device as shown in FIGURE 1 for an ophthalmic tonometer is indicated in FIGURE 2. The strain element is mounted upon a support 20, with the portion 11 of the strain element secured to the upper face of the support, and with the pin 14 passing through a suitable opening in the support and projecting at the lower face, which is curved to fit the cornea of the eye. The curved lower face of the support 20 is applied to the cornea as at 37, and the projecting end of the pin is displaced by the fluid pressure in the eye. Thereby the actuating portion 13 is deflected and the strain portion 12 is deformed. The strain gauge elements 16 will accordingly respond to the deflection of the actuating portion 13 of the spring. The response of the strain gauge elements 16 on opposite sides of the strain portion 12 will be in opposite senses, and are used in known manner to give any desired indication or control. For instance the elements 16 may be connected in series with a sensitive voltmeter to cooperate to deflect the voltmeter's pointer, the extent of the deflection indicating the displacement of the pin 14, which is a function of the pressure in the eyeball. To improve sensitivity, it is advantageous if the strain portion 12 has a greater compliance than portions 11 and 13.

FIGURE 3 shows a somewhat modified form of the construction, in which the pin 14 does not pass through the portion 11. In this arrangement the element 10 is carried by a housing or other structure 40, with the actuating portion 13 of the spring adjacent a protective disc 41 which forms a closure to the lower part of the housing. A guard ring and plug 42 is screw-threaded into the bottom of the housing and the pin 14 is guided for movement in the plug 42, and in contact with the portion 13. Leads 17 for the transducer elements 16 pass out through the upper part of the housing.

The guard ring 42 can be unscrewed, for cleaning the pin 14 and the guard ring itself, and the screw can be used as an adjusting device to control the extent of travel of the pin relative to the working surface. A locking ring can be added.

In the preferred device shown in FIGURES 4 and 5, the actuator portion of the strain element is extended round so that the spring member 10 substantially encloses a rectangle, the portion 13a, on which the pin bears being adjacent the mounting portion 11. The resilient part 12 of the member 10 is reduced in width so as to provide greater compliance of this part.

The pin comprises a shaped stainless steel peg 14a set partly into a cylindrical silicone rubber moulding 14b having external shoulders which cooperate with a corresponding shoulder in the guard ring 42 on the one hand to prevent detachment of the pin, and on the other hand with the mounting portion 11 of the member 10 to prevent the pin being driven in too far which might damage the strain element. The mounting portion 11 is screwed directly to the guard ring 42. The housing 40 is cylindrical and has an end-cap 43 which screws into the end remote from the guard ring 42. In this device the guard ring 42 is made from stainless steel, the housing 40 and end-cap 43 being made from a suitable plastics material.

An instrument of this kind has proved satisfactory in practice, for measuring the fluid pressures up to about 70 mms. of mercury. The pin 14a had a diameter of approximately 2 mms. at its lower end and was flat at that point which engaged the cornea of the eye, the peripheral diameter of the guard ring being approximately 1 centimeter. The weight of the instrument was less than five grams, lightness being an advantage for this purpose.

In the embodiments described a flexible membrane 43 of material such as latex, can be used to cover the working face of the support on the guard ring as shown in FIG. 3, to prevent ingress of moisture or dirt or, in the case of tonometer, the ingress of tears or corneal debris; the possibility of infection transmission is thereby reduced.

I claim:

1. A transducer device for an ophthalmic tonometer and including a resilient strain element which comprises a resilient member bearing at least one transducer element electrically sensitive to a bending strain, an actuator member extending at an angle from one end of said resilient member, a suport member secured to the other end of said resilient member and bearing a concave surface for cooperating with the cornea of an eye; and a pin extending movably through an aperture in said concave surface and connected to said actuator member for applying a bending stress to said transducer element.

2. A transducer device according to claim 1 wherein said resilient member forms the base of a U-shaped member of which the limbs comprise respectively said actuator member and a mounting member secured to said support member.

3. A transducer device as claimed in claim 1 wherein said support member is displaceable relative to said actuator member in a direction parallel to the direction of movement of said pin.

4. A transducer device as claimed in claim 1 and comprising flexible membrane covering said concave surface.

5. A transducer device as claimed in claim 1 wherein said pin extends from said actuator member away from said other end of said resilient member.

6. A transducer device as claimed in claim 1 wherein said pin is disposed substantially parallel to the length of the transducer element.

References Cited

UNITED STATES PATENTS

| 2,882,891 | 4/1959 | Husted | 79—80 XR |
| 3,082,621 | 3/1963 | Soderholm | 73—88.5 XR |
| 3,150,521 | 9/1964 | Mackay et al. | 73—80 |
| 3,261,204 | 7/1966 | Jacobson | 73—141 |

FOREIGN PATENTS

| 1,082,748 | 6/1954 | France. |

RICHARD C. QUEISSER, *Primary Examiner.*

JAMES J. GILL, *Examiner.*

C. A. RUEHL, *Assistant Examiner.*